(12) United States Patent
Winnberg

(10) Patent No.: US 6,335,946 B1
(45) Date of Patent: Jan. 1, 2002

(54) METHOD AND A DEVICE FOR BROADBAND TRANSMISSION

(75) Inventor: Jan-Olov Winnberg, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/904,178

(22) Filed: Aug. 1, 1997

(30) Foreign Application Priority Data

Aug. 2, 1996 (SE) .............................................. 9602916

(51) Int. Cl.[7] .............................................. H04B 1/713
(52) U.S. Cl. ...................................... 375/132; 375/239
(58) Field of Search ................................ 375/202, 272, 375/204, 239, 132

(56) References Cited

U.S. PATENT DOCUMENTS

| | | | | |
|---|---|---|---|---|
| 3,816,708 A | * | 6/1974 | Walton | ..................... 340/825.3 |
| 4,004,233 A | * | 1/1977 | Sakamoto | ................ 455/164.1 |
| 4,438,519 A | * | 3/1984 | Bose | .......................... 375/139 |
| 4,468,792 A | | 8/1984 | Baker et al. | |
| 5,073,903 A | | 12/1991 | Magne et al. | |
| 5,105,294 A | | 4/1992 | Degura et al. | |
| 5,263,046 A | | 11/1993 | Vander Mey | |
| 5,359,625 A | * | 10/1994 | May et al. | ................... 375/142 |

FOREIGN PATENT DOCUMENTS

EP 720 325 7/1996

* cited by examiner

*Primary Examiner*—Chi Pham
*Assistant Examiner*—Kevin M. Burd
(74) *Attorney, Agent, or Firm*—Burns, Doane, Swecker & Mathis, L.L.P.

(57) ABSTRACT

In a method and a system for transmission of information, broad band frequency sweeps are used. A certain sweep then denotes a certain symbol. The frequencies between which the sweeps occur are varied according to a pseudo-random scheme. Furthermore, a receiver for efficient detection of such broad band sweeps comprises reference oscillators in different receiving channels. The system has very good performance in terms of data rate, time delay, use of a large channel bandwidth, low probability of detection and low risk of tapping and good noise immunity.

15 Claims, 6 Drawing Sheets

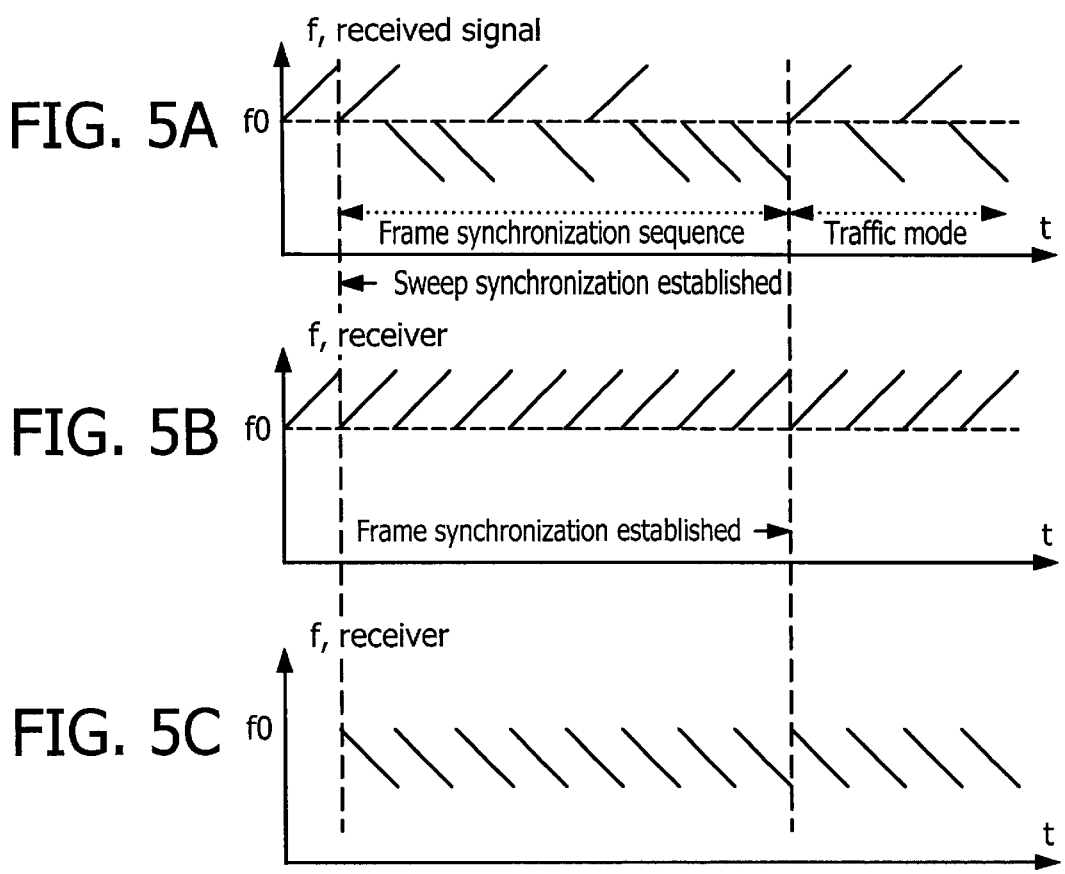

METHOD AND A DEVICE FOR BROADBAND TRANSMISSION

TECHNICAL FIELD

The present invention relates to a device and a method for transmission of information by means of using a spread spectrum technique.

BACKGROUND

In broadband data transmission, the transmission often has to meet certain requirements, and such requirements can be:

- high data rate
- short delay
- exploitation of a large channel band width
- low risk of detection or tapping
- good noise immunity Frequency hopping is a recognized method for creating a spread spectrum having a linear spectrum in an efficient manner, seen over a longer period. Frequency hopping is carried out by means of changing the transmitter and receiver carrier frequency in a predetermined manner. This puts high demands on time synchronization.

Frequency hopping does, however, not guarantee a high momentary band width and thereby high information band width. In order to obtain a high information band width, a modulation method, having a band width adapted to the requirements on information band width, in combination with the frequency hopping, is required.

A very large spread spectrum through frequency hopping also requires long hop sequences, which will result in practical limitations. The noise suppression of the method is directly dependent on the relationship:

$$\text{signal energy} * \text{spread spectrum factor/noise energy}$$

Furthermore, one drawback of the method is that it puts high demands on modulator and de-modulator, respectively, in order to change the frequency fast.

Another problem with this technique is that it is difficult to avoid detection, due to the high power density within a small frequency band, which results in that narrow band receivers also can be used for detecting such on-going traffic.

Another way of obtaining a spread spectrum is by means of direct sequence modulation. Direct sequence modulation is primarily used for obtaining a spread spectrum having a large momentary band width, thereby allowing a high information band width.

The direct sequence modulation is carried out by means of modulating the signal with a long, repeatable, random-like code sequence having a very high autocorrelation function. Since demodulation is carried out in a corresponding manner the signal will be re-created and possible noise will at the same time be suppressed by a factor corresponding to the length of the code sequence, i.e. more efficiently the longer the code sequence or direct sequence length are.

Hence, extreme broadband modulation will require extremely long code sequences, which will result in that, in particular, the demodulator becomes very complex. It can therefore be suitable to implement the demodulator in hardware instead of, which is commonly done, in software. However, also a hardware solution becomes very complex for long code sequences, having large circuit solutions as a result and thereby high costs.

The noise suppression is in the case of direct sequence modulation directly dependent on the relationship:

$$\text{signal energy} * \text{direct sequence length/noise energy}$$

A drawback of this method is that it puts high requirements on the accuracy of the synchronization in the receiver.

A further drawback is that the spectrum of the direct sequence spread spectrum signal is not linear, which reduces the theoretical process gain of the spread spectrum.

By means of combining direct sequence spread spectrum with frequency hop spread spectrum it is possible to obtain a larger spread spectrum than with the methods per se, since the implementations of the methods are limited by different factors, i.e. the limitations described above for the two methods.

In a combination of spread spectrum methods the spread spectrum is formed by the product of the two spread spectrum factors of the applied methods. Typically, the direct sequence modulation can provide for the power of the signal being spread over 10–20 MHz and the frequency can hop in the magnitude of GHz.

However, this technique also has some drawbacks. These mainly consist of higher implementation costs, but also in that even if the spectrum of the signal becomes relatively spread, it will still contain some spikes. This results in that the risk for detection becomes lower than, e.g. for pure frequency hop techniques, but still not minimum, due to the existence of the spikes in the spectrum.

Furthermore, U.S. Pat. No. 5,263,046 describes a spread spectrum technique which can be used for transmission of information by means of simultaneous sweeping from an intermediate frequency to the upper boundary of the channel and from the lower boundary of the channel to said intermediate frequency. Information is transmitted by modulating the sweep signals by means of phase switching.

U.S. Pat. No. 5,105,294 describes an optical transmission system which transmits and receives digital ones and zeros, as wave length shifted signals.

Also, U.S. Pat. No. 4,468,792 discloses a method and apparatus for data transmission, using chirped frequency shift keying (FSK) modulation. In order to overcome the problem resulting from i.a. continuous wave (CW) carriers in power line communication systems, the offset frequency of the carrier frequency, representing the information, i.e. being responsive to a particular logic value of a data bit to be transmitted, is swept during the transmission time of the data bit. Thus, by slowly varying the offset frequency in the FSK modulation during transmission of the data bit the interference resulting from CW carriers is reduced.

SUMMARY

It is an object of the present invention to provide a method and a device and a transmission system which overcome the problems with the prior art and which at the same time fulfil the requirements mentioned in the introduction, viz. a transmission system which can provide

- high data rate
- short delay
- exploitation of a large channel band width
- low risk of detection or tapping
- good noise immunity This object is obtained by transmitting data coded as pre-determined frequency sweeps in relation to a pre-determined frequency, a certain sweep corresponding to a certain symbol. Decoding is then carried out in a device comprising a corresponding number of receiver channels where sweeping reference oscillators, which generate reference signals, are used for verifying the presence of the transmitted, into frequency sweeps coded, symbols. The transmitter then transmits predetermined frequency sweeps during time intervals having a pre-determined duration. The receiver is then able to determine which symbol has been transmitted by means of determining the frequency sweep direction and/or the duration of the frequency sweep.

In order to shorten the time for synchronization in the receiver, each receiver channel can be equipped with a number of reference oscillators, which moreover can be made to follow different frequency sweep signals being displaced in time in relation to each other.

In order to further increase the channel band width and to make tapping and detection more difficult the selected given frequency can also be made to vary according to a pseudo-random scheme. In a preferred embodiment several reference oscillators are provided in each receiver channel, whereby the synchronization time can be reduced and also several, different, in relation to each other delayed, frequency sweep signals can be transmitted in the same frequency band.

DESCRIPTION OF THE DRAWINGS

The invention will now be described by way of non-limiting embodiments and with reference to the accompanying drawings, in which:

FIGS. 5a–5c show the momentary frequency of a transmitter and a receiver, respectively, during transmission of a frame synchronization sequence.

DETAILED DESCRIPTION

Figure 1A:
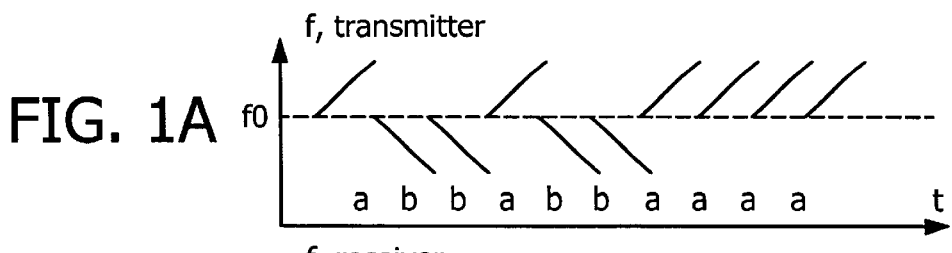
FIG. 1a shows the momentary transmitted frequency in a transmission system using two coded symbols and the FIGS. 1b and 1c show the momentary frequency of corresponding reference oscillators in decoding of the transmitted symbols.
Figure 1B:
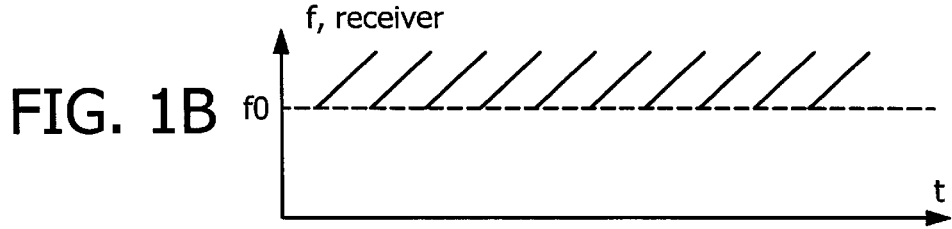
Figure 1C:
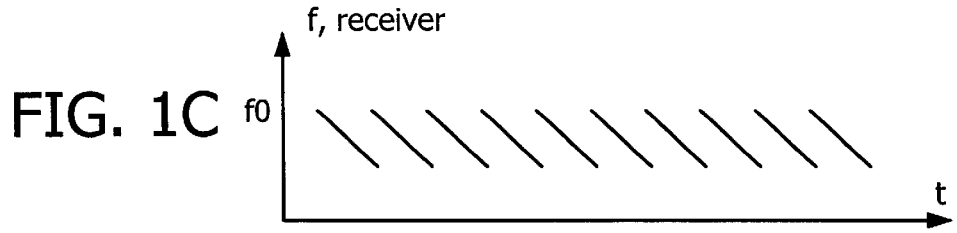

In FIGS. 1a–1c diagrams of the frequency as a function of time for point-to-point-transmission over a channel are shown. Two symbols, in FIG. 1a. denoted a and b, are transmitted modulated by means of broad band sweeping upwards and downwards, respectively, from a certain centre frequency ($f_0$).

The centre frequency ($f_0$) can either be pre-set to a fixed frequency or also vary according to a pseudo-random scheme in order to reduce the risk of detection or in order to make tapping impossible, in the case someone finds the correct centre frequency. In order to accomplish this the centre frequency is changed at suitable times, for example once/second, which is controlled in a known manner by internal synchronizing clocks inside the transmitter and the receiver, respectively.

During a sweep, which in the examples below last for 1 microsecond (1 $\mu$s), the transmitted signal sweeps, preferably linearly, from the centre frequency upwards or downwards over, in this case, 100 MHz.

The information is then contained only in the sweep itself, i.e. sweep start frequency, sweep end frequency and the length of the time interval during which the sweep lasts, in this case 1 $\mu$s. In the shown preferred embodiment the frequency sweeps, depending on the transmitted symbol, either upwards or downwards from the given centre frequency during this 1 $\mu$s time interval. The following two sweeps are possible, wherefore the capacity of the transmission is 1000000 baud or 1 Mbit/s, the two sweeps representing the value of one symbol, i.e. for example a logical one and a logical zero.

a (0) Positive sweep from centre frequency ($f_0 \rightarrow f_0+100$ MHz)

b (1) Negative sweep from centre frequency ($f_0 \rightarrow f_0-100$ MHz)

In demodulation a receiver having two channels, which each comprises a sweeping reference oscillator, and each receiver channel being used for detecting a certain sweep, see FIGS. 1b and 1c, in order to recreate the transmitted symbol sequence. Thus, in FIG. 1b a diagram of frequency sweeps which a first reference oscillator generates is shown as a function of time and in FIG. 1c corresponding frequency sweeps which a second reference oscillator generates in the second receiver channel is shown.

In FIGS. 2a–2e a method which is a variant of the one in FIGS. 1a–1c, where four different symbols can be transmitted point-to-point on a channel, is shown. The information is in this case contained both in start frequency and sweep direction. The following four sweeps are possible, wherefore the capacity of the transmission is 2000000 baud or 4 Mbit/s. The four sweeps represent the value of a symbol, which for example consists of two binary bits, each being a logical one or logical zero.

a (00) Positive sweep from centre frequency ($f_0 \rightarrow f_0+100$ MHz)

b (01) Negative sweep from centre frequency ($f_0 \rightarrow f_0-100$ MHz)

c (10) Positive sweep towards centre frequency ($f_0-100$ MHz)

d (11) Negative sweep towards centre frequency ($f_0+100$ MHz$\rightarrow f_0$)

Figure 2A:
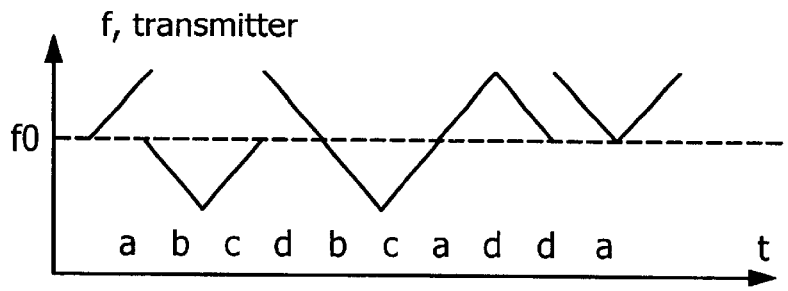
FIG. 2a shows the momentary transmitted frequency in a transmission system using four coded symbols and FIGS. 2b–2e show the momentary frequency of the corresponding reference oscillators in the decoding of the transmitted symbols.
Figure 2B:
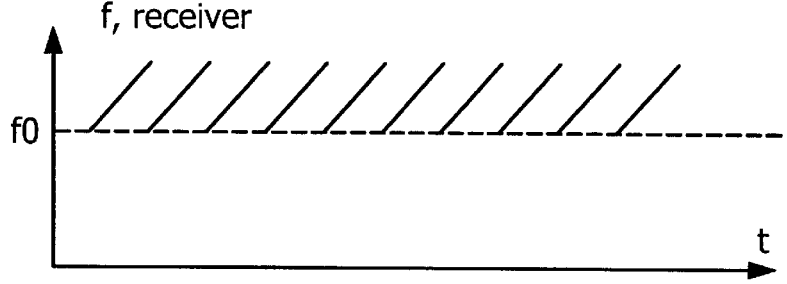
Figure 2C:
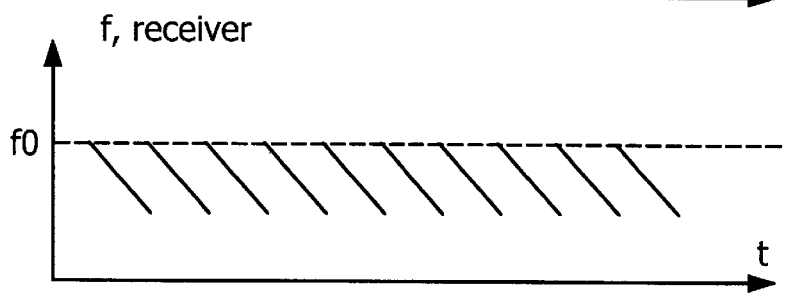
Figure 2D:
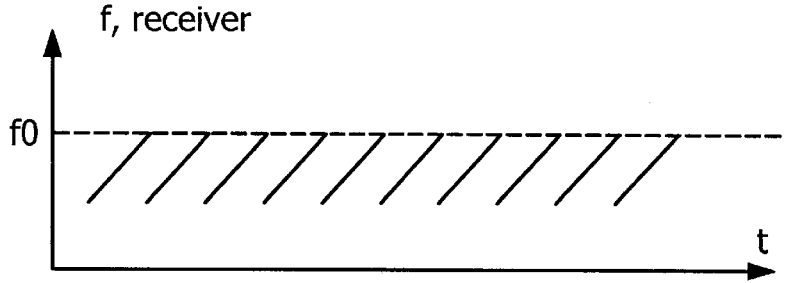
Figure 2E:
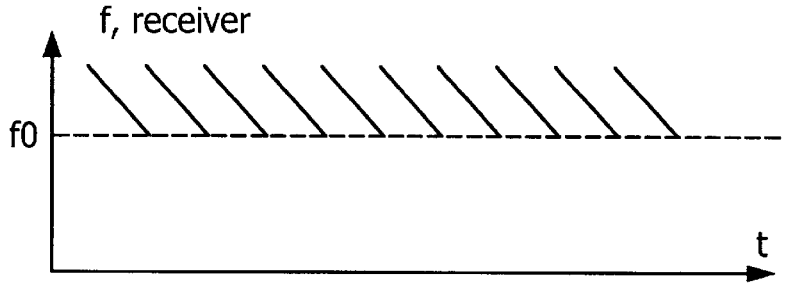

A transmitted sequence modulated according to this method is illustrated in FIG. 2a, which shows the transmitted frequency as a function of time. In demodulation four receiver channels are used in the receiver which each is used for verifying the presence of a certain sweep, see FIGS. 2b–2e which show the oscillator frequencies as a function of time for the four different receiver channels.

The method described above can also be used for providing transmission intended for transmission on two independent channels in the same frequency band, which is illustrated by the diagrams in FIGS. 3a–3e. By using this method two transmitters can transmit to one or several receivers simultaneously in the same frequency band.

Figure 3A:
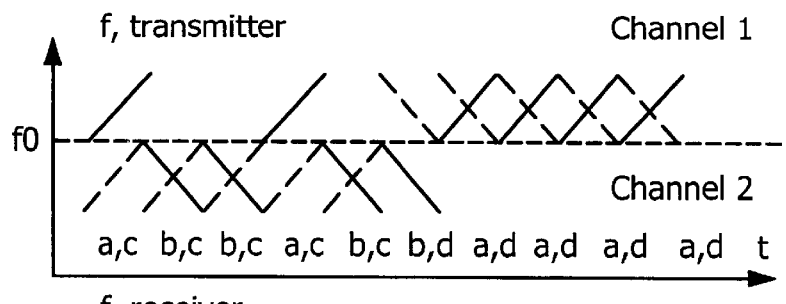
FIG. 3a shows the momentary transmitted frequency in a transmission system using four coded symbols, two of which are intended for a first receiver and the other two for a second receiver
Figure 3B:
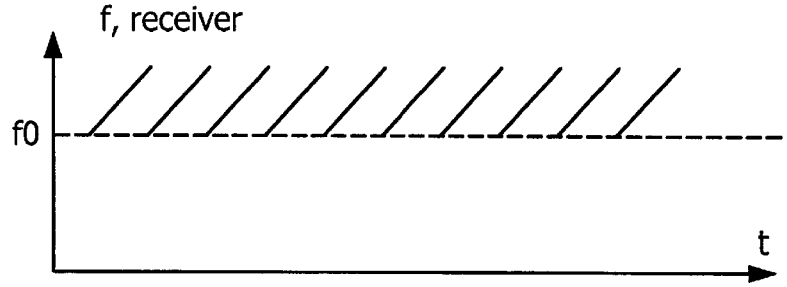
FIGS. 3b–3e show the momentary frequency of the corresponding reference oscillators in decoding of the transmitted symbols.
Figure 3C:
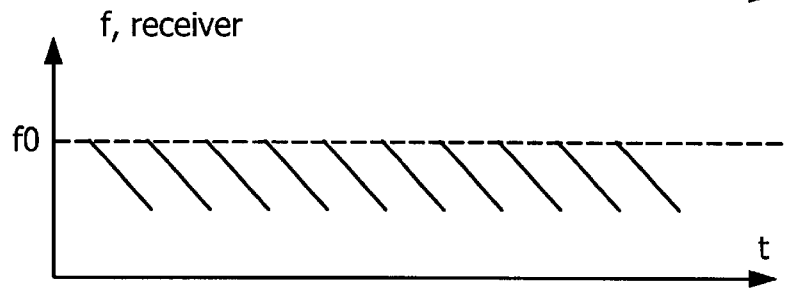
Figure 3D:
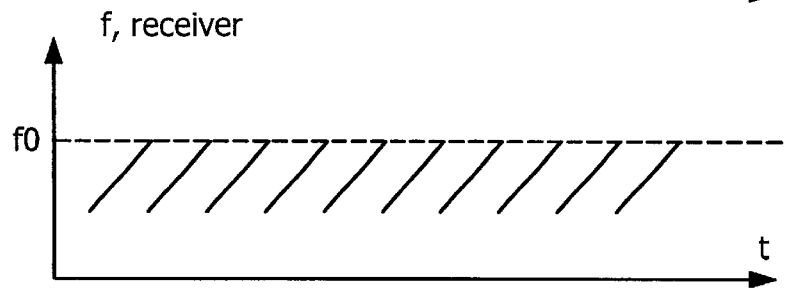
Figure 3E:
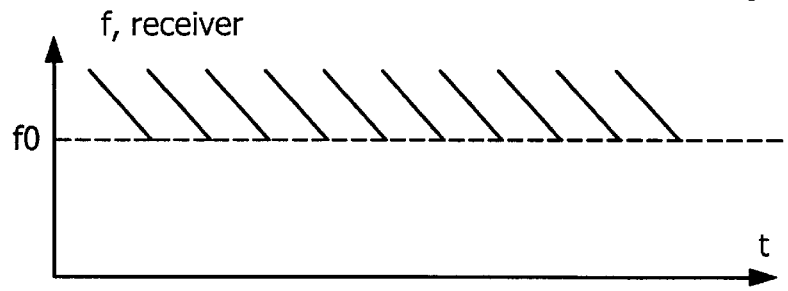

Thus, the same frequency band can be used for simultaneously transmitting information from two different transmitters to one and the same receiver or the frequency band can be used for simultaneously transmitting information from two different transmitters to two different receivers by means of using the method shown in FIG. 3a.

Modulation is also in this case carried out by means of broad band sweeping by, in the chosen example, a 100 MHz sweep during the time of 1 microsecond.

The information for each of the two channels is here contained both in start frequency and sweep direction, see FIG. 3a. For example, the sweeps shown in FIGS. 3b–3e can be used for transmission on the two different channels, wherefore the capacity of the transmission is 1000000 baud or 1 Mbit/s per channel. The four sweeps represent the value of one symbol for the two channels, i.e. for example a logical one or a logical zero.

In demodulation four receiver channels each comprising a sweeping reference oscillator are used, as in the embodiment described in FIGS. 2b–2e, each oscillator being used to detect a certain sweep, see FIGS. 3b–3e. Channel 1 in the shown example corresponds to the continuous line on which the symbols a and b are transmitted, whereas channel 2 corresponds to the dotted line on which the symbols c and d are transmitted.

In all of the above described examples, a synchronization of the sweep oscillators of the receivers with the received signal and the synchronization of transmitted frames is required. For synchronization detection of the received signals a multitude of sub-receivers can be arranged per receiver channel and be used independently of each other if one-channel transmission or multi-channel transmission is used. I.e., in each receiver channel a multitude of reference oscillators having mutually delayed start times are arranged. Depending on the utilization of the transmission this gives different performance regarding synchronization times. The limitation in such an embodiment lies in the receiving equipment and depends on the number of available sub-receivers.

The synchronization is carried out in two steps, a sweep synchronization where the sweep generator of the receiver is synchronized with the sweep of the incoming signal followed by a frame synchronization where the frames, i.e. the delimiting elements of the information blocks, are identified in order to synchronize the channel coding, i.e. the error-correcting coding in the information transmission itself.

Before the sweep synchronization has been carried out the receiver is in a synchronization searching mode when the receiver searches over the time domain by delaying the sweep start time for the reference oscillators by inserting a time shift thereon, for example by inserting a delay constituting a part of the time interval between the start time for two consecutive frequency sweeps, for example a 0.1 $\mu$s long delay after each group of 10 sweeps before the next group of 10 sweeps starts. The effective band width of the receiver is in this example 10 MHz which results in that 100 sweeps may be required before sweep synchronization can take place. This results in that an expected synchronization time becomes approximately 50 * 1 $\mu$s=50 $\mu$s.

The synchronization sequence consists of a number of repeated identical sweep patterns. When the receivers detect a sweep they are automatically synchronized to this sweep.

Figure 4A:
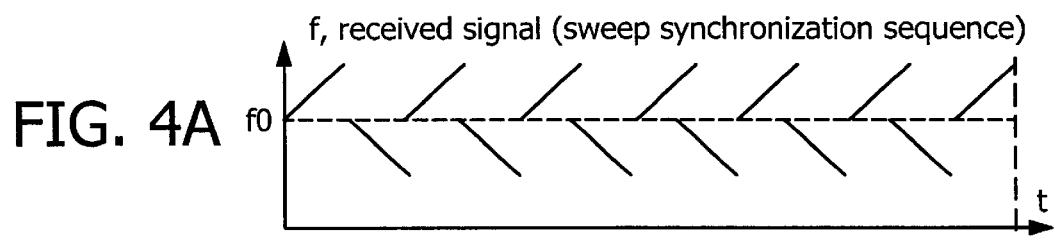
FIGS. 4a–4c show the momentary frequency of a transmitter and a receiver, respectively, during transmission of a sweep synchronization sequence.
Figure 4B:
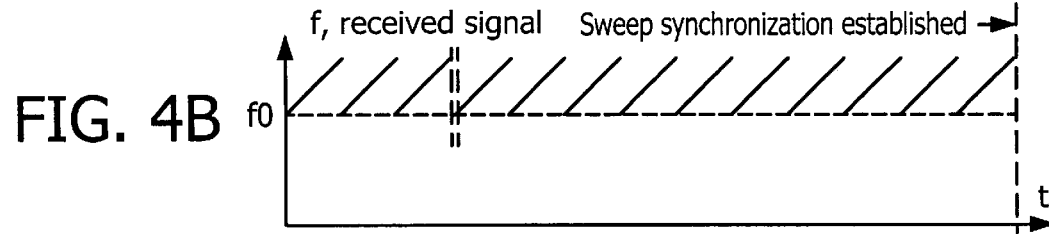
Figure 4C:
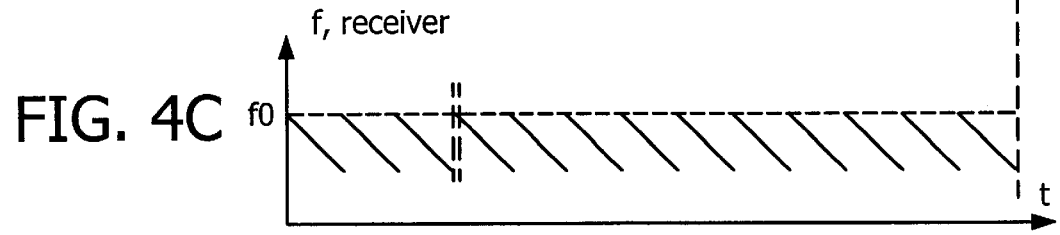

FIGS. 4a–4c show a sweep synchronization sequence which is received, see FIG. 4a, in order to be compared to the signals which are generated by the sweep oscillators of the receiver, see FIGS. 4b and 4c. Thereupon the receivers switch to automatically follow the centre frequency and time position, in case this varies with time. This is carried out by means of reading and correcting the remaining errors in sweep start time and sweep start frequency for the upwards and downwards directed frequency sweep of the reference oscillators.

However, the synchronization time can be reduced if, in accordance with above, each receiver channel is equipped with a number of sub-receivers, which preferably have starting times delayed by 1/M $\mu$s in relation to each other, where M is the number of sub-receivers in each receiver channel.

By using such an arrangement a reduction of the expected value for the synchronization time to approximately 50/M $\mu$s is obtained. Furthermore, by using such an arrangement the receiver can be made to receive traffic from several transmitters simultaneously. This is obtained in the following manner:

First one set of sweep oscillators in a sub-receiver detects that a signal is transmitted. These are then locked on this signal and continues to follow this until the signal traffic ends. The rest of the sub-receivers continue to search the time domain for other signals which are displaced in time in relation to the first signal. This method is repeated until all sub-receivers follow their own signal. In this manner the entire channel band width of the receiver can be used.

Furthermore, the same frequency band can be used by different transmitters if the transmitted frequency sweeps from the different transmitters are transmitted during unequally long time periods, i.e. the sweep duration is different for different transmitters. Thus, a first transmitter could transmit a frequency sweep lasting during 1 $\mu$s and second transmitter could transmit the same frequency sweep but spread over another time interval, for example 2 $\mu$s. This, however, of course, requires that the receiver which is to receive the transmitted frequency sweeps has knowledge about the length of the frequency sweeps which a transmitter transmits, and that the corresponding reference oscillators which generate reference signals having a corresponding duration are arranged in the receiver.

After that the demodulators of the receiver have been synchronized according to the above the receivers switch to search for a special frame synchronization sequence. The received sequence is then compared to a particular sequence having a high autocorrelation function, for example a Gold sequence. Frame synchronization then takes place when the cross correlation between the received sequence and the sequence of the receiver exceeds a certain threshold value or when maximal cross correlation has been found. This comparison is carried out in a correlator intended therefor, which measures the cross correlation between a received sequence and the predetermined sequence.

After that a frame synchronization has been carried out the channel is in traffic mode, i.e. transmission of information has begun, which is shown in FIGS. 5a–5c.

Frame synchronization is in a preferred embodiment carried out not only in the initial stage of the communication but is repeated periodically. In case of an absent frame synchronization the receiver returns to synchronization searching mode after a predetermined time period.

Each transmission is terminated with an end sequence or EOT-sequence (End Of Transmission) which makes it possible for the receivers to rapidly change from traffic mode to synchronization searching mode. In case a not received EOT-sequence transition from traffic mode to synchronization searching mode is carried out after that the frame synchronization has been absent for a predetermined time period.

The principal construction of a receiver used for receiving transmission of two different kinds of symbols will now be described with reference to FIG. 6, where the transmitted signal is assumed to be generated as described in conjunction with FIG. 1a.

Figure 6:
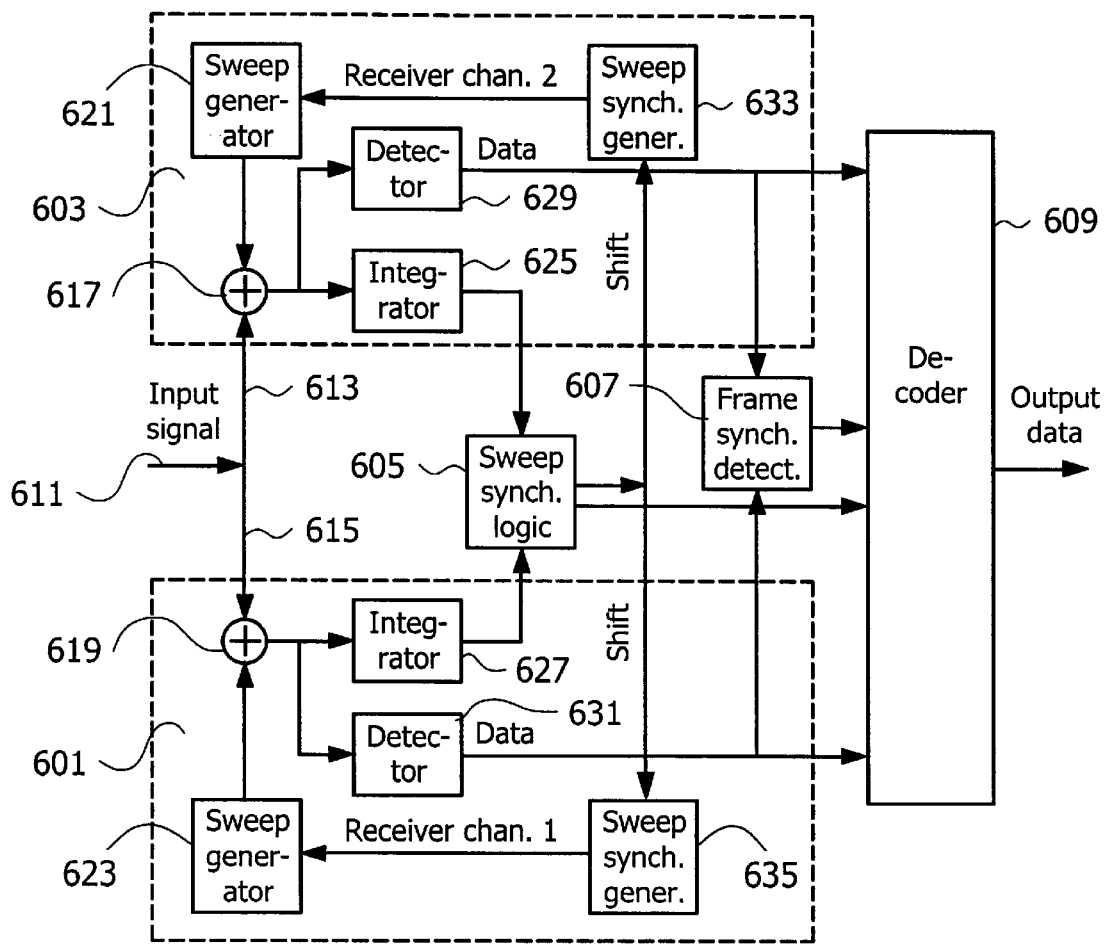
FIG. 6 is a schematic block diagram of a receiver for reception of two different symbols.

Thus, the block scheme in FIG. 6 shows the construction of a receiver without sub-receivers for transmission of information coded by means of two different symbols consisting of a receiver channel for each wave form (sweep) 601 and 603 respectively, one sweep synchronization logic unit 605 common for the two receiver channels, one common frame synchronization detector 607 and a decoder 609, which combines the output from the two receiver channels and decodes these into symbols which are output as a flow of output data.

An incoming signal 611 is fed via two lines 613 and 615, respectively, to respective difference forming circuits 617 and 619. In the difference forming circuits 617 and 619 the difference between the input signal and signals generated by two sweep generators 621 and 623 is formed. The sweep generators 621 and 623 generate signals corresponding to the transmitted symbols, i.e. the sweep generator 621 generates a positive sweep from the centre frequency ($f_0 \rightarrow f_0 +$ 100 MHz) and the sweep generator 623 generates a negative sweep from the centre frequency ($f_0 \rightarrow f_0 - 100$ MHz) during a time interval corresponding to the time interval during which the transmitted frequency sweep lasts, i.e. in this case 1 $\mu$s. The output signals from the difference forming circuits 617 and 619 is then fed both to integrators 625 and 627 and to detectors 629 and 631. The integrators 625 and 627 integrate the output signals from the difference forming circuits 617 and 619 over a time interval. In a preferred embodiment the output signals are integrated during a time interval from the sweep start time of the reference oscillators to the sweep end time of the reference oscillators or over integer multiples thereof. Thereupon the output signal from the integrators is fed to the sweep synchronization logic block 605.

Depending on the signals from the integrators 625 and 627 the sweep synchronization logic block decides whether sweep synchronization is decided to be established or not. If sweep synchronization is established the sweep synchronization logic block locks the sweep synchronization generators 633 and 635 in this time position whereupon the sweep synchronization logic block 605 emits a signal to the decoder 609 indicating that sweep synchronization is now completed. If sweep synchronization is decided not to be established the sweep synchronization logic block emits a signal to the sweep synchronization generators 633 and 635, respectively, indicating that these shall insert a time shift in the generated frequency sweep.

The decision about when shift synchronization is determined can either be established depending on if the output signal level from any of the integrators 625 and 627 goes below a certain threshold value or depending on the time shift which generates the lowest output signal level from some one of the integrators 625 and 627.

When synchronization is established the decoder 609 starts to receive the data which are generated by the two detectors 629 and 631. The detectors 629 and 631 decide for each sweep, if a symbol corresponding to the sweep generated in the sweep generators 621 or 623 has been received as an input signal or not. Such a decision is taken in response to the output signal from the circuits 617 and 619. If a detector 629 or 631 decides that an input signal corresponding to the one generated by a receiver channel 601 or 603, respectively, has arrived, the detector 629 or 631 emits a signal to the decoder 609 indicating that a symbol corresponding to this receiver channel 601 or 603 has been detected.

The signals corresponding to the different symbols are also fed to the frame synchronization detector 607. This searches for a certain frame synchronization sequence. When this sequence has been found the frame synchronization detector 607 emits a signal to the decoder 609 indicating that frame synchronization is now established. Thereupon the decoder 609 starts to emit signals corresponding to the symbols which are detected in the detectors 629 and 631.

Figure 7:
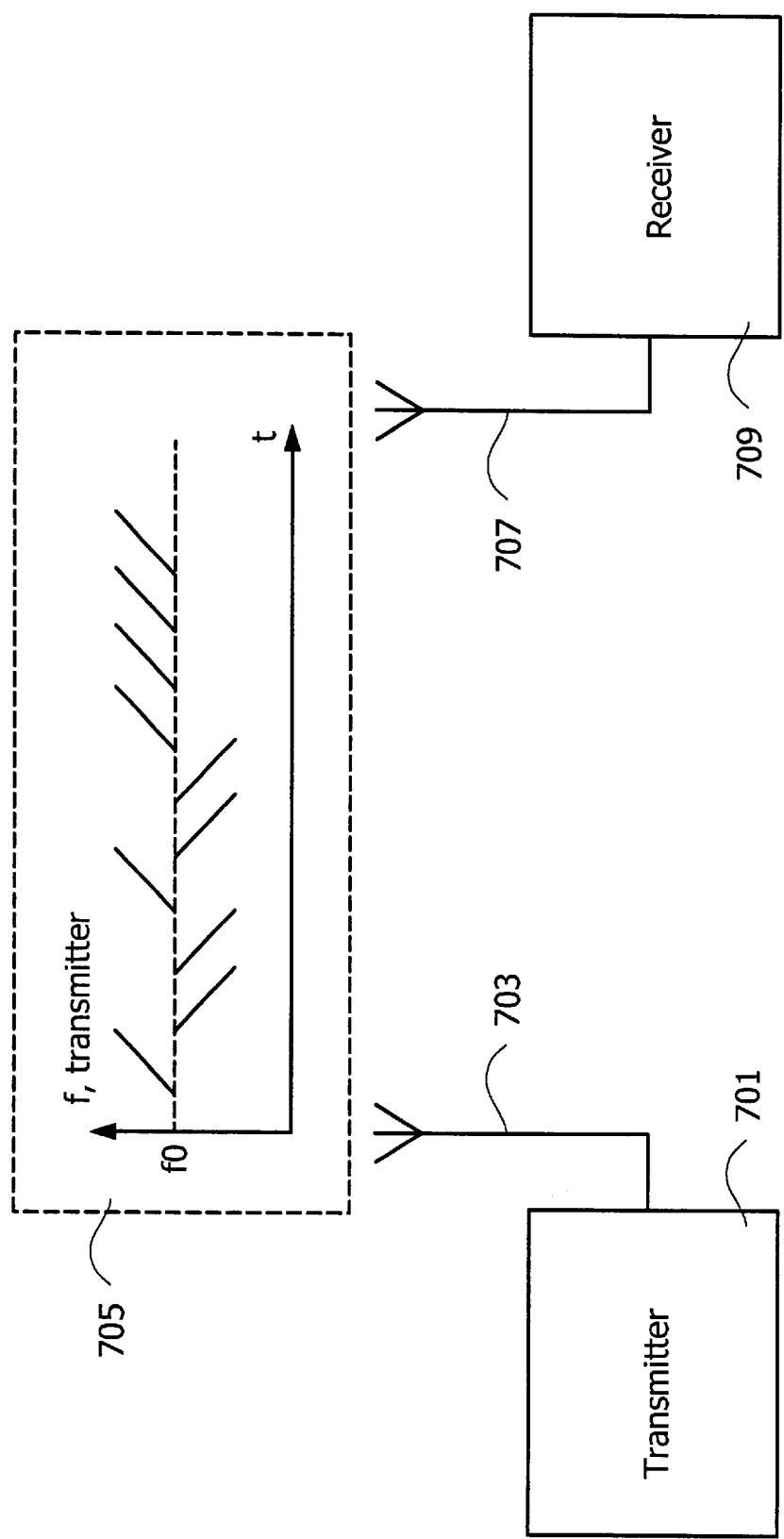
FIG. 7 is a general block diagram of a transmission system using frequency sweeping for transmission of information.

Finally, in FIG. 7, a general block diagram of a transmission system which uses frequency sweeping for transmitting information is shown. Thus, a transmitter 701 which via an antenna 703 transmits a sequence of frequency swept signals 705 according to the above described coding method is shown. This sequence of frequency sweep is then received via an antenna 707 by a receiver 709 in which frequency sweep detection, demodulation and other signal processing then is carried out.

The above described technique can be used for one-channel transmission of information or for multi-channel transmission in a number of different types of information transmission systems, the application area being civil as well as military.

What is claimed is:

1. A method for transmitting information from a transmitter to a receiver, comprising the steps of:

transmitting the information as frequency sweeps corresponding to different symbols from the transmitter; and receiving the frequency sweeps by the receiver;

wherein each symbol's possible transmitted sweep start time, sweep end time, sweep start frequency, sweep end frequency, and signal sweep characteristics are determinable in the receiver, and a symbol is decoded in the receiver using only information contained in a frequency sweep direction, and wherein at least one of the sweep start frequency and the sweep end frequency pseudorandomly varies in time.

2. The method of claim 1, wherein two different symbols are transmitted, a first symbol is transmitted as a first frequency sweep from or towards a given frequency, a second symbol being transmitted as a second frequency sweep from or towards the given frequency, and the first and second frequency sweeps are not identical.

3. A method for transmitting information from a transmitter to a receiver, comprising the steps of:

transmitting the information as frequency sweeps corresponding to different symbols from the transmitter; and receiving the frequency sweeps by the receiver;

wherein each symbol's possible transmitted sweep start time, sweep end time, sweep start frequency, sweep end frequency, and signal sweep characteristics are determinable in the receiver, and a symbol is decoded in the receiver using only information contained in a frequency sweep direction, and wherein four different symbols are transmitted, a first symbol is transmitted as a frequency sweep upwards from a given frequency, a second symbol is transmitted as a frequency sweep downwards from the given frequency, a third symbol is transmitted as a frequency sweep upwards towards the given frequency, and a fourth symbol is transmitted as a frequency sweep downwards towards the given frequency.

4. A method for transmitting information from a transmitter to a receiver, comprising the steps of:

transmitting the information as frequency sweeps corresponding to different symbols from the transmitter, and receiving the frequency sweeps by the receiver;

wherein each symbol's possible transmitted sweep start time, sweep end time, sweep start frequency, sweep end frequency, and signal sweep characteristics are determinable in the receiver, and a symbol is decoded in the receiver using only information contained in a frequency sweep direction, and wherein the receiver receives signals from two different transmitters at the same time, a first symbol is transmitted as a frequency sweep upwards from a given frequency, a second symbol is transmitted as a frequency sweep downwards from the given frequency, a third symbol is transmitted as a frequency sweep upwards towards the given frequency, a fourth symbol is transmitted as a frequency sweep downwards towards the given frequency, two of the different symbols are transmitted from a first one of the transmitters, and the remaining two symbols are transmitted from a second one of the transmitters.

5. A system for transmitting information symbols from a transmitter to a receiver, comprising:

means, in the transmitter, for transmitting the information symbols as frequency swept signals; and means, in the receiver, for detecting the frequency swept signals and for determining which information symbol was transmitted by only determining a sweep direction;

wherein the detecting and determining means comprises a number of receiver channels corresponding to a number of transmitted symbols, and each of the receiver channels comprises at least one reference oscillator for following a received frequency swept signal.

6. The system of claim 5, wherein each receiver channel comprises a plurality of reference oscillators that have sweep start times which are displaced in time in relation to each other.

7. The system of claim 5, wherein each of the transmitter and the receiver further comprises means for pseudorandomly varying at least one of the sweep start frequency and the sweep end frequency.

8. The system of claim 5, wherein two different information symbols are transmitted, and the transmitter comprises means for transmitting one information symbol as a first frequency swept signal having a frequency sweeping from or towards a given frequency and means for transmitting the other symbol as a second frequency swept signal having a frequency sweeping from or towards the given frequency, the sweeps of the first and second frequency swept signals not being identical.

9. A system for transmitting information symbols from a transmitter to a receiver, comprising:

means, in the transmitter, for transmitting the information symbols as frequency swept signals; and means, in the receiver, for detecting the frequency swept signals and for determining which information symbol was transmitted by only determining a sweep direction;

wherein four different information symbols are transmitted, and the transmitter comprises means for transmitting a first information symbol as a frequency swept signal having a frequency sweeping upwards from a given frequency, a second information symbol as a frequency swept signal having a frequency sweeping downwards from the given frequency, a third information symbol as a frequency swept signal having a frequency sweeping upwards towards the given frequency, and a fourth information symbol as a frequency swept signal having a frequency sweeping downwards towards the given frequency.

10. A system for transmitting information symbols from a transmitter to a receiver, comprising:

means, in the transmitter, for transmitting the information symbols as frequency swept signals; and means, in the receiver, for detecting the frequency swept signals and for determining which information symbol was transmitted by only determining a sweep direction;

wherein the receiver receives signals from two different transmitters at the same time, and each transmitter comprises means for transmitting one information symbol as a frequency swept signal having a frequency sweeping upwards from a given frequency, a second information symbol as a frequency swept signal having a frequency sweeping down-wards from the given frequency, a third information symbol as a frequency swept signal having a frequency sweeping upwards towards the given frequency, and a fourth information symbol as a frequency swept signal having a frequency sweeping downwards towards the given frequency, two of the different information symbols being transmitted from a first one of the transmitters and the remaining two information symbols being transmitted from a second one of the transmitters.

11. A method for transmitting information from a transmitter to a receiver, comprising the steps of:

transmitting the information as frequency sweeps corresponding to different symbols from the transmitter;

receiving the frequency sweeps by the receiver; and verifying a presence of a repetitive first signal having a frequency that sweeps between a first and a second frequency during a first time interval, wherein the step of verifying the presence of the repetitive first signal comprises the steps of:

a) forming a difference between the first signal and at least one repetitive reference signal having a frequency that sweeps between the first and second frequency during a second time interval corresponding to the first time interval;

b) integrating the difference over a third time interval for forming a number of second signals corresponding to the number of reference signals, each second signal having a signal level;

c) displacing in time the at least one reference signal when none of the signal levels of the second signals is below a threshold value;

d) repeating steps a), b), and c) until one of the signal levels of the second signals is below the threshold value; and e) verifying the presence of the first signal when one of the signal levels of the second signals goes below the threshold value;

wherein each symbol's possible transmitted sweep start time, sweep end time, sweep start frequency, sweep end frequency, and signal sweep characteristics are determinable in the receiver, and a symbol is decoded in the receiver using only information contained in a frequency sweep direction.

12. The method of claim 10, wherein steps a)–e) are repeated in order to verify a consecutive occurrence of the first signal.

13. The method of claim 10, wherein the number of reference signals is at least two, and the reference signals are delayed in time in relation to each other by a part of the first time interval.

14. A system for transmitting information symbols from a transmitter to a receiver, comprising:

means, in the transmitter, for transmitting the information symbols as frequency swept signals;

means, in the receiver, for detecting the frequency swept signals and for determining which information symbol was transmitted by only determining a sweep direction; and a device for verifying a presence of a repetitive first signal having a frequency that sweeps between a first and a second frequency during a first time interval, wherein the device comprises:

means for generating at least one repetitive reference signal having a frequency that sweeps between the first and the second frequency during a second time interval corresponding to the first time interval;

means for forming a difference between the at least one reference signal and the first signal;

means for integrating the difference over a third time interval for obtaining a number of second signals corresponding to the number of reference signals, each second signal having a signal level;

means for displacing in time the at least one reference signal if none of the signal levels of the second signals is below a threshold value; and means for verifying the presence of the first signal when one of the signal levels of the second signals is below the threshold value.

15. The device of claim 14, further comprising, when at least two reference signals are generated, means for temporally displacing the reference signals by a part of the first time interval.

* * * * *